United States Patent Office 3,280,129
Patented Oct. 18, 1966

3,280,129
PROCESS FOR D-LYSERGIC ACID HALIDE HYDROHALIDES
Rudolf Griot and Albert Frey, Hanover, N.J., and Albert Hofmann, Bottmingen, Switzerland, assignors to Sandoz Ltd. (also known as Sandoz A.G.), Basel, Switzerland
No Drawing. Filed Dec. 18, 1963, Ser. No. 331,387
Claims priority, application Switzerland, Dec. 21, 1962, 15,015/62
4 Claims. (Cl. 260—285.5)

The present invention relates to a new and improved process for the production of substantially pure D-lysergic acid chloride hydrochloride in high yield useful as an intermediate for pharmaceutical compounds of the ergot alkaloid type.

It is known in accordance with a recent proposal in U.S. Patent 3,084,164 that D-lysergic acid chloride hydrochloride can be produced by the reaction of free D-lysergic acid with suitable chlorinating agents in an inert solvent in which the starting material is only difficultly soluble so that it is mainly in suspension. In that proposal phosphorus oxychloride, with phosphorus pentachloride or thionyl chloride, was used as the chlorinating agent. An excess of the phosphorus oxychloride or acetonitrile, carbon disulfide, chloroform, dimenthylformamide or petroleum ether was used as the solvent. In accordance with that technique, however, D-lysergic acid chloride hydrochloride could only be obtained in a yield of about 40% to 50% as a crude product which still contained substantial amounts of starting material. Depending upon the reaction conditions the content of D-lysergic acid chloride hydrochloride in the crude product amounted to about 70% to 80%.

In accordance with the present invention it has been found that D-lysergic acid chloride hydrochloride can be obtained in a 90% to 95% yield as a practically pure compound containing in excess of 95% of D-lysergic acid chloride hydrochloride. This can be attained through the use of a combination of tetrahydrofuran and chloroform as solvent and a combination of phosphorus trichloride and phosphorus pentachloride as chlorinating agent by following a definite reaction sequence.

Inasmuch as the primary use of D-lysergic acid chloride hydrochloride resides in its conversion with amines, amine alcohols or the peptide radical of natural ergot alkaloids into pharmacologically highly active compounds and since the yield and the commencement of the reaction depend to a very large extent on the purity of the D-lysergic acid chloride hydrochloride used, it has been found to be of decisive importance for the technical and commercial feasibility of the reactions to use D-lysergic acid chloride hydrochloride of high purity and in good industrial yield. For example, when impure D-lysergic acid chloride hydrochloride containing approximately 65% of pure compound, even if obtainable by the prior technique, is reacted with the hydrochloride of the aminocyclol:

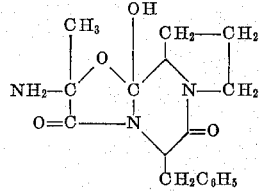

the natural (+)-ergotamine is obtained in a yield of approximately 30%, but by using D-lysergic acid chloride hydrochloride of approximately 95% purity a 70% yield can be obtained.

The preferred method for carrying out the process of the present invention comprises diluting an ice cold solution of phosphorus trichloride in absolute tetrahydrofuran with absolute chloroform, cooling the solution to 5° C., adding pulverized anhydrous D-lysergic acid and additional chloroform and then while maintaining the same temperature adding dropwise a solution of freshly sublimed phosphorus pentachloride in phosphorus trichloride, further stirring at 0° C. in the dark for several hours, pouring the reaction mixture on absolute petroleum ether, immediately filtering off by suction and washing the resulting compound with a further portion of absolute petroleum ether. The chlorination is carried out in a nitrogen atmosphere.

The invention is illustrated by the following non-limitative example in which temperatures are in degrees centigrade (uncorrected).

EXAMPLE 29 milliliters of absolute tetrahydrofuran are cooled to 0° in an apparatus through which nitrogen has been passed and the entire reaction is effected under nitrogen, i.e., in a nitrogen atmosphere. 9 milliliters of freshly distilled phosphorus trichloride and 15 milliliters of absolute chloroform are then added and the mixture which thereupon warms slightly is cooled to 5° and 5 grams of freshly dried finely pulverized D-lysergic acid are added in a single portion while stirring vigorously and the mixture is then washed with 14 milliliters of absolute chloroform. The solution which again warms slightly is cooled to 0° to 5° and a solution of 4.66 grams of freshly sublimed phosphorus pentachloride in 48 milliliters of freshly distilled phosphorus trichloride is added dropwise over a period of thirty minutes. The reaction mixture is stirred in the dark for four hours at a temperature between 0° and 5° and is then poured onto 200 milliliters of absolute petroleum ether of a boiling point of 45° to 50°. The precipitate which forms is immediately filtered off under suction and washed with five 40 milliliter portions of absolute petroleum ether. The resulting dark grey D-lysergic acid chloride hydrochloride is dried at 50° in a vacuum for thirty minutes under absolute conditions. The yield of D-lysergic acid chloride hydrochloride is 6.5 grams having a purity of at least 95%, the total yield being virtually quantitative.

What is claimed is:
1. A method of producing substantially pure D-lysergic acid chloride hydrochloride in a high yield of at least 90% to 95% which comprises adding a solution of freshly sublimed phosphorus pentachloride in phosphorus trichloride to anhydrous D-lysergic acid in an ice cold solution of phosphorus trichloride in absolute tetrahydrofuran and absolute chloroform and recovering the resulting D-lysergic acid chloride hydrochloride.
2. A method according to claim 1, in which the D-lysergic acid chloride hydrochloride is recovered by pouring the reaction mixture on absolute petroleum ether, suction filtering and washing the resulting product with absolute petroleum ether.
3. A method according to claim 1, in which the chlorination is carried out in a nitrogen atmosphere.
4. A method of producing D-lysergic acid chloride hydrochloride having a purity in excess of 95% in a yield of over 90% which comprises adding freshly distilled phosphorus trichloride and absolute chloroform to absolute tetrahydrofuran cooled to about 0° C., adding freshly dried pulverized D-lysergic acid thereto under vigorous stirring and while maintaining said temperature not over 5° C., washing the mixture with absolute chloroform, cooling to 0° C. to 5° C., dropwise adding a solution of freshly sublimed phosphorus pentachloride in freshly distilled phosphorus trichloride during a period of thirty minutes and, after stirring the reaction mixture in the dark for about four hours at a temperature between 0° C. and 5° C., pouring the said reaction mixture onto absolute petroleum ether and recovering the D-lysergic acid chloride hydrochloride precipitate thereby resulting, the chlorination being carried out under nitrogen.

References Cited by the Examiner
UNITED STATES PATENTS 3,084,164   4/1963   Frey _____ 260—285.5

ALEX MAZEL, *Primary Examiner.*

NICHOLAS S. RIZZO, *Examiner.*

DONALD G. DAUS, *Assistant Examiner.*